(12) United States Patent
Faccioli et al.

(10) Patent No.: US 10,087,982 B2
(45) Date of Patent: Oct. 2, 2018

(54) ADJUSTABLE SPHERICAL JOINT MEMBER

(71) Applicant: TECRES S.P.A., Sommacampagna (VR) (IT)

(72) Inventors: Giovanni Faccioli, Monzambano (IT); Renzo Soffiatti, Nogara (IT)

(73) Assignee: TECRES S.P.A., Sommacampagna (VR) (IT)

( * ) Notice: Subject to any disclaimer, the term of this patent is extended or adjusted under 35 U.S.C. 154(b) by 307 days.

(21) Appl. No.: 14/758,930

(22) PCT Filed: Jan. 13, 2014

(86) PCT No.: PCT/IB2014/058232
§ 371 (c)(1),
(2) Date: Jul. 1, 2015

(87) PCT Pub. No.: WO2014/108877
PCT Pub. Date: Jul. 17, 2014

(65) Prior Publication Data
US 2015/0337890 A1    Nov. 26, 2015

(30) Foreign Application Priority Data

Jan. 11, 2013 (IT) .............................. VR2013A0006

(51) Int. Cl.
*F16C 11/00* (2006.01)
*F16C 11/06* (2006.01)
*F16C 11/10* (2006.01)

(52) U.S. Cl.
CPC .......... *F16C 11/06* (2013.01); *F16C 11/0604* (2013.01); *F16C 11/106* (2013.01); *Y10T 403/32631* (2015.01)

(58) Field of Classification Search
CPC ..... Y10T 403/32631; Y10T 403/32704; Y10T 403/32909; F16C 11/06; F16C 11/0604;
(Continued)

(56) References Cited

U.S. PATENT DOCUMENTS 2,984,249 A * 5/1961 Sears, Jr. ............... A45B 11/00
135/114
3,498,579 A * 3/1970 Vicary ..................... B60R 1/06
248/481

(Continued)

FOREIGN PATENT DOCUMENTS

| EP | 0950374 A2 | 10/1999 |
| FR | 2810873 A1 | 1/2002 |
| WO | WO9400066 A1 | 1/1994 |

*Primary Examiner* — Amber Anderson
*Assistant Examiner* — Nahid Amiri
(74) *Attorney, Agent, or Firm* — Tutunjian & Bitetto, P.C.

(57) ABSTRACT

The present invention relates to a ball joint, associable with a first and a second component for their connection in an adjustable position, including a spherical element, at least partially housable in a hollow housing seat of said first component, an insert, connected to such a spherical element and removably associable with such a second component, wherein the spherical element includes a substantially cylindrical central portion, interposed between two substantially spherical cap shaped portions arranged with respect to one another so that each circular base of each substantially spherical cap shaped portion matches a respective base of such a substantially cylindrical portion.

6 Claims, 4 Drawing Sheets

(58) Field of Classification Search
CPC ......... F16C 11/106; B60G 7/005; B60G 7/02; B60G 17/00; B60G 2206/50
USPC ........ 403/76, 77, 122, 131, 156; 280/86.756
See application file for complete search history.

(56) References Cited

U.S. PATENT DOCUMENTS

| | | | |
|---|---|---|---|
| 3,795,922 A | 3/1974 | Herbert et al. | |
| 4,140,413 A * | 2/1979 | Conrad | F16D 1/09 279/16 |
| 4,520,983 A | 6/1985 | Templeman | |
| 4,565,345 A | 1/1986 | Templeman | |
| 5,562,737 A | 10/1996 | Graf | |
| 5,746,548 A * | 5/1998 | Crandall | F16C 11/0604 248/481 |
| 6,164,860 A * | 12/2000 | Kondo | B62D 7/22 280/93.51 |
| 6,234,961 B1 * | 5/2001 | Gray | A61B 17/02 403/122 |
| 6,921,226 B2 * | 7/2005 | Rundle | F16C 11/106 403/135 |
| 7,210,871 B2 * | 5/2007 | Slatter | B63B 17/02 114/343 |
| 7,452,154 B2 * | 11/2008 | Aoshima | F16B 21/082 362/514 |
| 7,670,077 B2 * | 3/2010 | Jan | F16C 11/0623 285/262 |
| 7,691,131 B2 * | 4/2010 | Graf | A61B 17/7007 606/256 |
| 8,038,162 B2 * | 10/2011 | Knopp | B60G 7/005 280/124.106 |
| 8,960,629 B2 * | 2/2015 | Rizk | F16M 11/14 248/481 |
| 2004/0045493 A1 * | 3/2004 | Schmidt | F16C 11/0604 114/361 |
| 2009/0143827 A1 * | 6/2009 | Levy | A61B 17/7037 606/308 |
| 2011/0245876 A1 | 10/2011 | Brumfield | |

\* cited by examiner

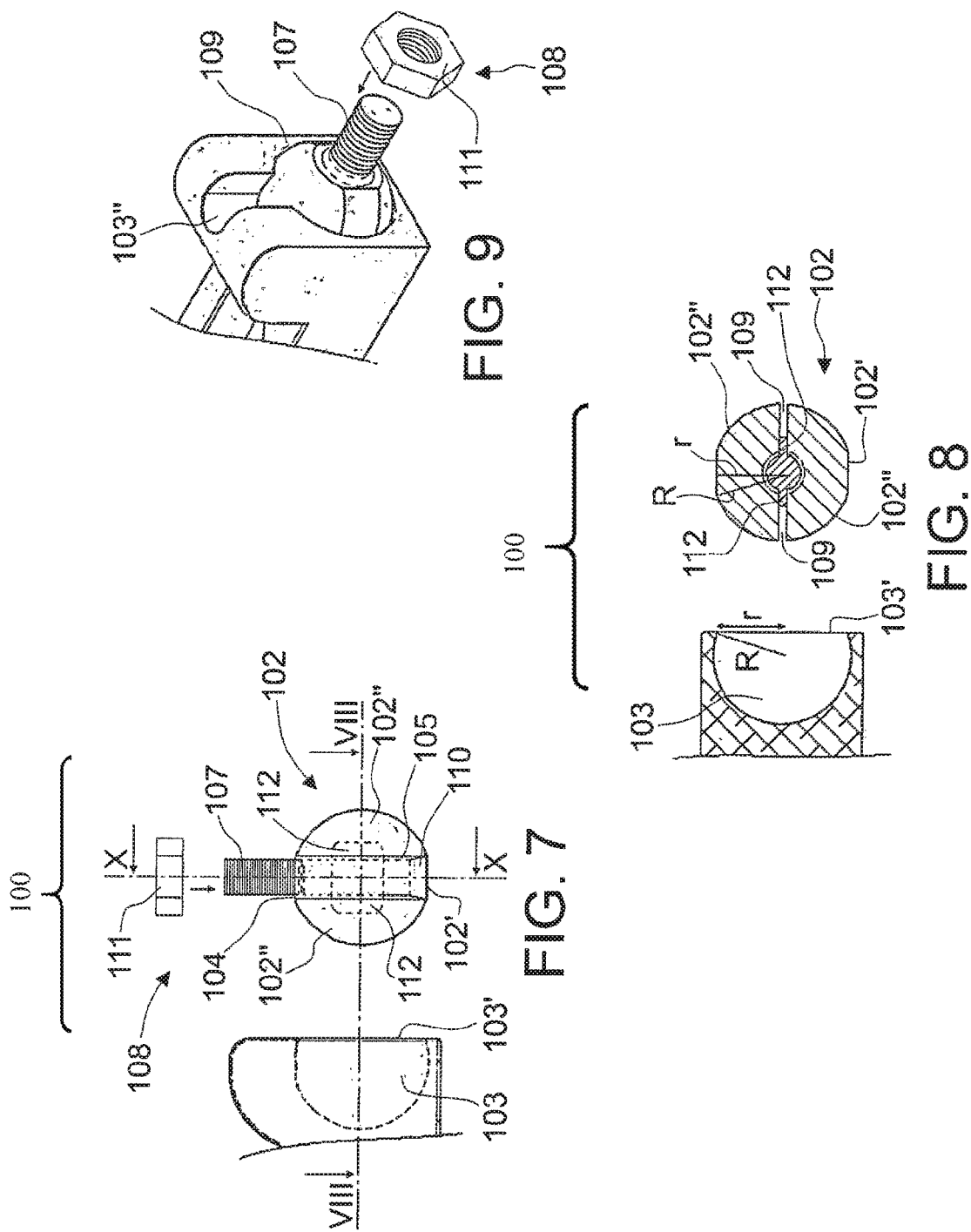

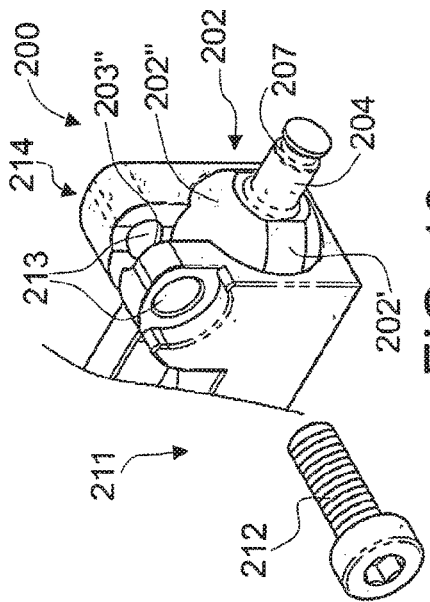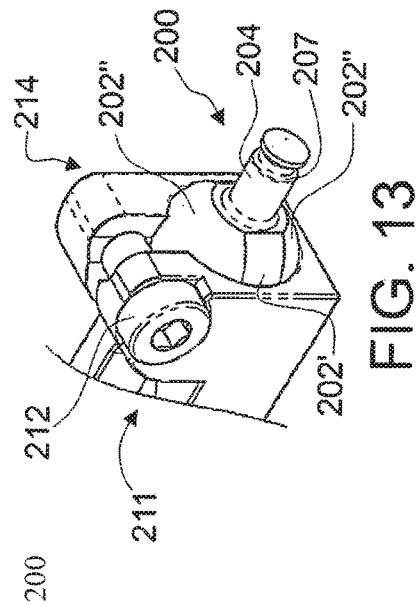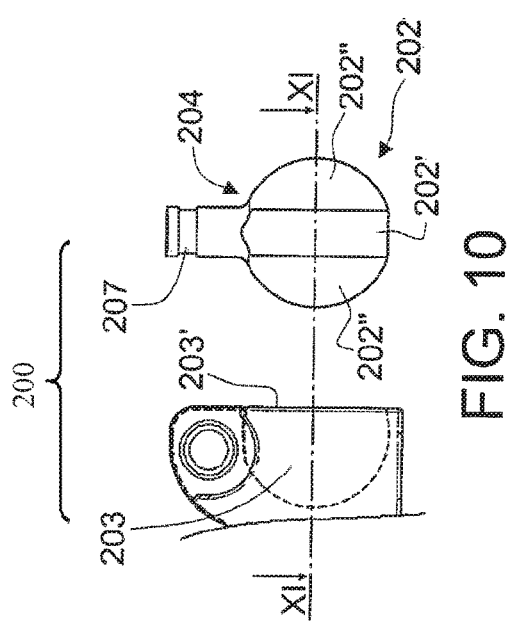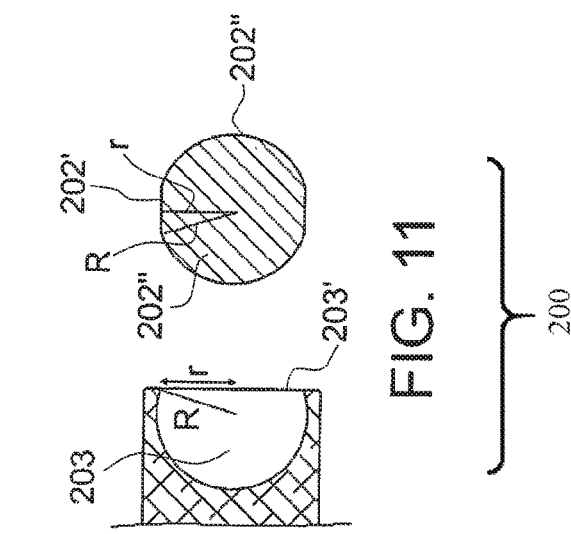

ADJUSTABLE SPHERICAL JOINT MEMBER

CROSS REFERENCE TO RELATED APPLICATIONS

This application claims priority to Italy Patent Application No. VR2013A000006, filed Jan. 11, 2013 and PCT/IB2014/058232, filed Jan. 13, 2014.

TECHNICAL FIELD OF THE INVENTION

The present invention refers to a ball joint of the adjustable type, and in particular to a ball joint for stable connection of a first and second component in adjustable positions.

STATE OF THE ART

The use of a ball joint for the articulated connection between at least two components is known in various sectors such as, for example, the automobile industry, medical sector, etcetera.

Known types of ball joints comprise a housing seat that is obtained in or associated with a first component, and a spherical element that is equipped with a pin, which is associated with a second component.

By introducing the spherical element in the respective seat, for example spherical, the connection between the first component and the second component is obtained.

With reference to the automobile industry, a typical application of the ball joints is provided for the connection between the suspensions arms, thereby obtaining a rotatable movable articulated connection between the members forming the suspension itself.

In other sectors, like for example the medical sector, adjustable ball joints are used, through which it is possible to vary and subsequently block the relative position between two components associated with the joint itself.

Such conventional ball joints comprise blocking means that are suitable for preventing/allowing the movement of the ball joint itself in the respective housing seat.

Such blocking means, indeed, prevent/allow the relative rotation of the spherical element, which is associated with a second component, inside the respective housing seat, obtained in or associated with a first component, thus making the first and the second component fixed/movable with respect to one another.

In one known embodiment, the blocking means comprise an element similar to a perforated cap that is associated through a threaded ring nut with the spherical seat. The hole allows the pin associated with the spherical element to pass through it. The cap has a hollow portion that is substantially spherical or the like, that is suitable for being placed in abutment against the spherical element of the joint. Therefore, by screwing the cap in the spherical seat the cap is brought in abutment against the spherical element, thereby preventing the ball joint from moving.

If it is necessary to modify the connection position between the first and the second component it is possible to loosen the cap, disengaging it from the spherical element, and modify the assembly configuration of the ball joint itself.

In a further embodiment the spherical seat, wherein the spherical element of the joint is to be housed, comprises two shells connected to one another through removable connection means such as, for example screws, pins, threaded ring nuts or removable connection means in general.

Each of the two shells has, inside it, a substantially semi-spherical hollow portion, which matches the spherical element of the joint.

By clamping the two shells to one another, the respective hollow portions are brought into abutment against the spherical element, thus blocking the movement of the joint.

Conventional types of ball joints have a certain structural complexity in order to allow the joint itself to be blocked/released.

Moreover, conventional blocking mean provides for making hollow portions to be removably associated with respective seats so as to be able to block/allow the rotation of the ball portion of the joint.

One drawback of such blocking means is the requirement of making seats, wherein the ball portion of the joint is to be housed, that are extremely precise so as to avoid undesired jamming during the movement of the joint itself that would, otherwise, cause the joint itself to be positioned imprecisely.

SUMMARY OF THE INVENTION

One object of the present invention is to improve the state of the art.

A further object of the present invention is to prove an adjustable ball joint, which is suitable for ensuring a connection between a first and a second component in adjustable positions, whose configuration is simple, and comprises a small number of components.

A further object of the present invention is to provide a ball joint of the adjustable type that ensures a stable and secure connection between a first and a second component.

Another object of the present invention is to provide a ball joint of the adjustable type that comprises blocking/releasing means the actuation thereof being simple and easy.

In accordance with one aspect of the present invention a ball joint of the adjustable type is provided according to the present principles.

The present specification refers to preferred and advantageous embodiments of the invention.

BRIEF DESCRIPTION OF THE DRAWINGS

Further features and advantages of the present invention shall become clearer from the detailed description of three preferred, but not exclusive, embodiments of an adjustable ball joint, which is illustrated for indication and not limiting purposes, in the attached drawing tables, wherein:

FIG. 7 is a side view of a ball joint according to a second embodiment of the present invention;

FIG. 8 is a section view of the ball joint of FIG. 7, taken along line VIII-VIII of FIG. 7;

FIG. 9 is a slightly top perspective view of the ball joint of FIG. 7 in the "movable" configuration inserted in the respective housing seat;

FIG. 10 is a side view of a ball joint according to a third embodiment of the present invention;

FIG. 11 is a cross-section view of the ball joint of FIG. 10, taken along line XI-XI of FIG. 10;

FIG. 12 is a slightly top perspective view of the ball joint of FIG. 10 in the "movable" configuration, inserted in the respective seat of a respective component; and FIG. 13 is a perspective view of the ball joint of FIG. 10 inserted in the respective seat of a respective component and in the "blocked" configuration.

DETAILED DESCRIPTION OF THE INVENTION

Figure 1:
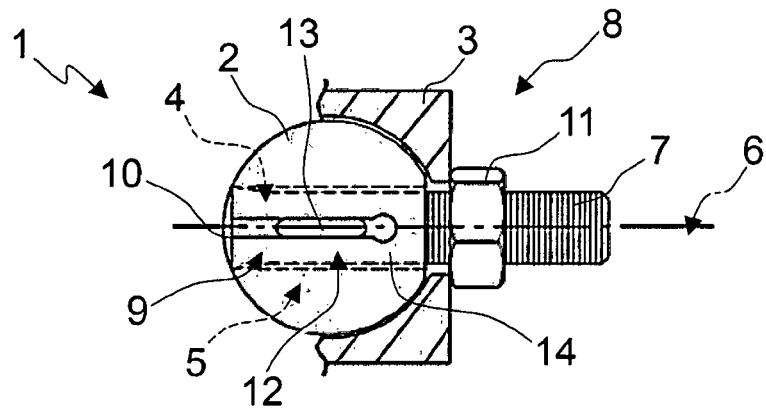
FIG. 1 is a schematic side view of the assembly of the ball joint according to a first embodiment of the present invention, in a "movable" configuration.

The ball joint according to the present invention is foreseen for connecting at least two components of a medical device such as, for example, a fixator, a prosthesis, a spacer, etcetera, to one another.

However, it should be understood that the ball joint can be used also in devices belonging to commodity sectors other than the medical sector, without departing for this reason from the present invention.

With reference, first, to FIGS. 1 to 4, reference numeral 1 wholly indicates a ball joint according to a first preferred embodiment of the present invention, for connecting a first component to a second component, which are not shown in the figures.

The ball joint 1 is of the adjustable type, since it makes it possible to modify the position of the first and second component connected thereto, with respect to one another, and, subsequently, block them in the desired position by acting upon suitable blocking means, as better described in the rest of the description.

The joint 1 comprises a substantially spherical element 2, which is suitable for being positioned inside a hollow seat 3, obtained in a first component, and an insert 4, which is partially housed inside the spherical element 2, which can be associated with a second component.

The spherical element 2 has a through opening 5 along which the insert 4 is positioned.

In particular, the insert 4, which has an elongated shape, is movable with respect to the spherical element 2 along a longitudinal axis 6.

Figure 2:
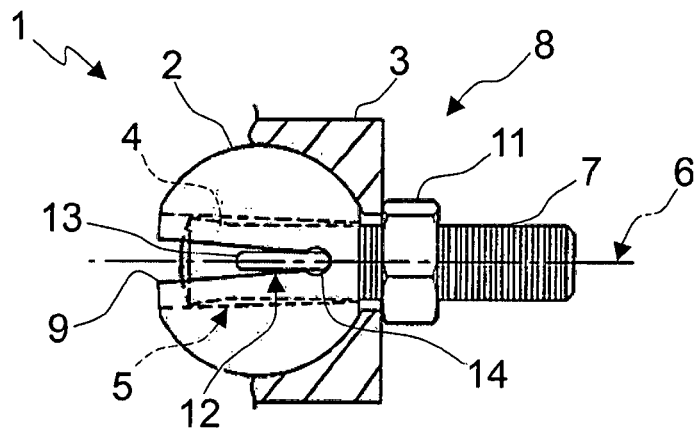
FIG. 2 is a schematic side view of the assembly of the ball joint of FIG. 1 in a "blocked" configuration.

As illustrated in FIGS. 1 and 2, the longitudinal axis 6 is coaxial with the through opening 5 of the spherical element 2.

The insert 4 has a threaded portion 7 at least along the portion thereof, which projects outside the spherical element 2.

The threaded portion 7 allows the removable connection of the ball joint 1 to a first or to a second component.

Therefore, the ball joint 1, as illustrated in the figures, has at one end the spherical element 2 and at the opposite end a threaded portion 7 that comes out from the spherical element 2 itself.

In order to connect a first and a second component to one another through the ball joint 1, the spherical element 2 is inserted in the seat 3, obtained in the first or in the second component. The opposite end of the ball joint 1, i.e. the threaded portion 7, is connected to a corresponding threaded seat, which is not shown in the figures, of the second or first component, respectively. In such a way, a connection of the movable type is initially obtained.

Specifically, the spherical element 2 is free to rotate inside the hollow seat 3 and, therefore, it allows the orientation of the ball 1 along a substantially unlimited number of planes.

In order to partially limit or completely block the rotation of the spherical element 2 with respect to the seat 3 blocking means 8 are provided, which are suitable for obtaining a radial expansion of the spherical element 2 as is described in greater detail below.

The spherical element 2 has at least one notch 9, of the radial type, designed to allow the radial expansion of the spherical element 2 itself.

Figure 3:
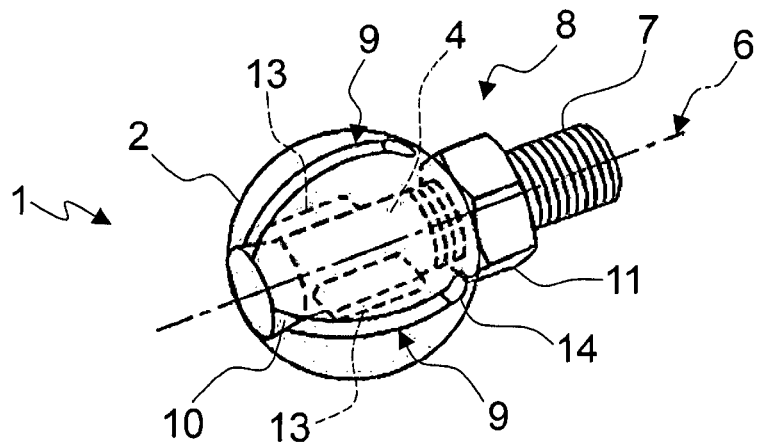
FIG. 3 is a perspective view of the ball joint of FIG. 1.

For example, two notches 9 can be provided, which are diametrically opposite to one another, so as to obtain a substantially symmetrical radial expansion of the spherical element 2 itself. The spherical element 2 can also have a different number of notches that are angularly equidistant from one another, for example 3 or 4 as illustrated in FIG. 3.

The blocking means 8 comprise an enlarged portion 10, which is formed at the end of the insert 4 arranged inside the spherical element 2, and at least one locking nut 11 that can be operatively associated with the ball joint 1. In particular, the locking nut 11 can be associated with the threaded portion 7 of the insert 4.

The advancement of the insert 4 along the through opening 5 is determined by rotating the locking nut 11.

The enlarged portion 10, for example with a substantially truncated conical shape or the like, has at least one cross-section that is greater with respect to a cross-section of the through opening 5 of the spherical element 2.

Therefore, as an example, as illustrated in FIG. 2, following the movement of the insert 4 inside the spherical element 2, obtained by the rotation of the at least one locking nut 11, the enlarged portion 10 penetrates inside the spherical element 2 leading to a radial expansion thereof.

Due to such a radial expansion, the outer surface of the spherical element 2 is partially or completely placed in abutment against the inner surface of the seat 3.

The amount of interference between the outer surface of the spherical element 2 itself and the inner surface of the seat 3 can be varied as a function of the amount of radial expansion of the element 2, partially limiting or completely blocking the movement of the ball joint 1.

As can be noted, the configuration of the enlarged portion 10 of the insert is different from the configuration of the through opening 5 at such a portion 10. This is advantageous since the contact area between the insert 4 and the opening 5 is reduced and therefore the friction between them, thereby facilitating the sliding of the insert 4 inside the through opening 5 both in one way and the other. Moreover, since the radial expansion of the spherical element 2 is substantially symmetrical, the spherical element 2 abuts in a uniform manner against the seat 3, thereby ensuring a stable and secure blocking of the ball joint 1.

By acting on the at least one locking nut 11 in a reverse manner the outer diameter of the spherical element 2 is reduced restoring this way the movement of the ball joint 1.

In order to ensure an even more secure and stable blocking of the blocking means 8, it is possible to provide a counter-nut, not shown in the figures, to be placed in abutment against the locking nut 11 and avoid, in such a way, accidental loosening thereof.

Furthermore, the locking nut 11 can comprise elastic elements of the per se known type or equivalent elements, so as to ensure the stable locking thereof along the threaded portion 7.

In the version illustrated in FIGS. 1 and 2, in which the seat 3 is partially shown, the spherical element 2 is completely housed inside the seat 3 and the at least one locking nut 11 is positioned outside the seat 3 itself.

Figure 4:
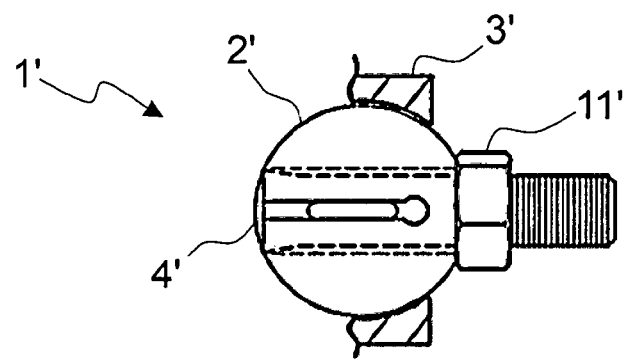
FIG. 4 is a schematic side view of a variant of the assembly of the ball joint according to a first embodiment of the present invention, in the "movable" configuration.
Figure 5:
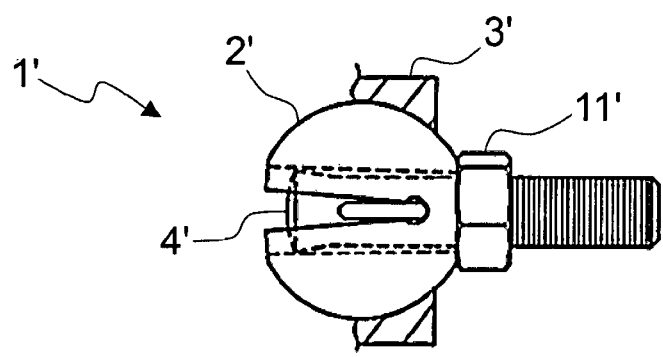
FIG. 5 is a schematic side view of the assembly of the ball joint, according to FIG. 5, in the "blocked" configuration.

According to a variant of the ball joint of the first embodiment of the present invention, illustrated in FIGS. 4 and 5, reference numeral 1' wholly indicates a ball joint comprising a spherical element 2' that is substantially identical to the spherical element 2 described above, which spherical element 2 is partially housed inside a seat 3', the remaining part being outside. According to this variant, the at least one locking nut 11' is in abutment against the spherical element 2' itself. The operation of the ball joint 1' according to this variant of the first embodiment of the present invention is the same as that described for the first variant.

The ball joint 1' can comprise a washer or a similar element, not shown in the figures, between the at least one locking nut 11' and the spherical element 2', in order to avoid possible damaging of the spherical element 2' during the rotation of the locking nut 11'.

In order to ensure a correct centring of insert 4 along through opening 5, in order to ensure a radial expansion that is substantially symmetrical to the spherical element 2, at least one guide element 12 is provided, projecting from the insert 4 and slidingly engaged in the at least one notch 9.

Preferably, at least two guide elements 12 are provided, opposite to one another, engaged in corresponding notches 9 obtained in the spherical element 2 in diametrical position.

In one embodiment illustrated in FIG. 3, the guide element 12 comprises two tabs 13 projecting diametrically from the insert 4.

However, further embodiments are possible, in which the guide element 12 has the shape of a pin or the like, designed for sliding along corresponding notches 9. Moreover, the at least one guide element 12 prevents the relative rotation of the insert 4 with respect to the spherical element 2, during rotation of the at least one locking nut 11 along threaded portion 7.

In such a way, a correct movement of the insert 4 inside the spherical element 2 is ensured without jamming. In order to not to hinder the relative rotation of the spherical element 2 inside the seat 3, the at least one guide element 12 is completely inside the spherical element 2.

The advancing of the insert 4 within the spherical element 2 depends upon the extension of the at least one radial notch 9 along the spherical element 2 itself.

In order to avoid cracks from forming at the closed end of the at least one notch 9, due to the expansion of the spherical element or subsequent expansion/compression cycles thereof, a shaped groove 14 can be provided.

Figure 6:
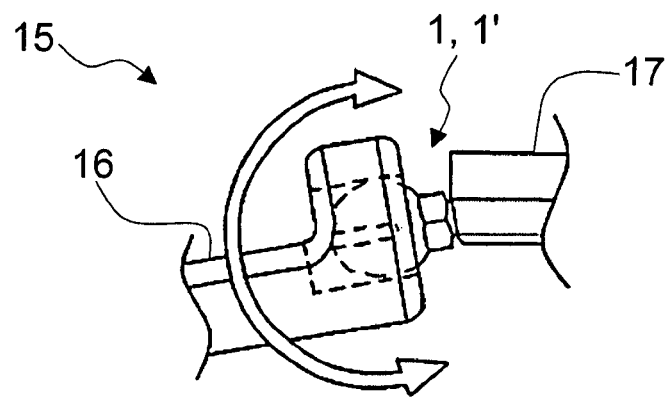
FIG. 6 is a partial side view of a medical device comprising a ball joint according to the first embodiment of the present invention.

The groove 14, moreover, acts as a stop for the at least one guide element 12 along the spherical element 2. FIG. 6, as an example and not for limiting purposes, illustrates one embodiment of the ball joint 1 according to the present invention.

In such an embodiment a ball joint 1, 1' is provided for connecting some components forming an external fixing device 15 for treating bone fractures.

Specifically, the external fixator device 15 provides for the use of a ball joint 1, 1' for the adjustable articulated connection of a first member 16 to a second member 17.

However, further uses of the ball joint 1 are possible in medical devices different from the fixator device 15 indicated above or from devices belonging to other commodity sectors without departing, for this reason, from the scope of protection of the present invention.

With reference to FIGS. 7 to 9, a ball joint according to a second embodiment of the present invention is indicated with the reference numeral 100 and comprises, like in the first embodiment, a substantially spherical element 102, designed to be housed in a hollow seat 103, the seat being obtained in a first component, and an insert 104 with an elongated shape, which is connected to the spherical element 102 and can be associated with a second component.

The configuration of the spherical element 102 is however different with respect to that of the first embodiment. More particularly, the spherical element comprises a substantially cylindrical central portion 102', between two substantially spherical cap shaped portions 102".

The spherical element 102 is sized so that the circular base of each substantially spherical cap shaped portion 102" matches a respective base of the substantially cylindrical portion 102'. The spherical element 102 can be obtained either enbloc, for example through milling of a portion of the outer surface of the spherical element 102, or through the assembly, in a way known to the skilled person, of many separate components. The substantially cylindrical central portion 102' has, at its circular cross-section, a radius r shorter than the curvature radius R of each spherical cap 102", so that the spherical element 102 has reduced overall dimensions in a plane parallel to the bases of such a cylindrical central portion 102' (FIG. 8).

The spherical element 102, at the substantially cylindrical central portion 102', has a through opening 105 for housing the insert 104. Such a through opening 105 is obtained at the longitudinal axis of symmetry x-x of the spherical element 102 and the insert 104, having an elongated shape, is translatably movable in it along the same axis.

The insert 104 has at least one threaded portion 107, at least along the portion projecting outside the spherical element 102. The threaded portion 107 makes it possible the removable connection of the ball joint 100 to a second component.

For such a purpose, a threaded housing seat with a threading pitch corresponding to that of the insert 104 is specifically provided on the second component, for the screwing and blocking of one inside the other.

In order to partially limit or completely block the rotation of the spherical element 102 with respect to seat 103, blocking means 108 are provided, which are suitable for obtaining a radial expansion of the spherical element 102, as is better described below, when the spherical element is inserted in the respective housing seat 103.

The spherical element 102 has at least one notch 109 (see FIGS. 8 and 9), of the radial type, starting from the through opening 105, designed for allowing the expansion in the radial direction.

For example, at least two notches 109 can be provided, which are diametrically opposite to one another so as to obtain a substantially symmetrical radial expansion of the spherical element 102. A different number of notches 109 can also be provided, for example, three preferably evenly angularly spaced with respect to one another around the longitudinal axis of symmetry x-x of the spherical element 102. Other positions of the notches around the spherical element are clearly possible.

The blocking means 108, designed for blocking in position the ball joint 100, once it has been inserted into the respective housing seat 103, comprise, similarly to the first embodiment of the present invention, an enlarged portion 110, that is obtained at the end of the insert 104 inside the spherical element 102, and at least one locking nut 111 that can be operatively associated with the insert 104.

The enlarged portion 110, for example with a substantially truncated conical shape or similar, has at least one cross-section greater than a cross-section of the through opening 105 of the spherical element 2 (in the example illustrated in FIG. 7 it is the section at the end of the insert 104). Particularly, the locking nut 111 can be associated, in use, with the threaded portion 107 of the insert 104.

Accordingly, with such a configuration, as already described for the first embodiment, a backward movement of the insert 104 within the through opening 105, obtained by the rotation of the locking nut 111, leads to a homogeneous expansion in the radial direction of the spherical element 102 since the enlarged end portion of the insert 110, moving back in the opening 105, pushes the spherical element itself in a radial direction.

It should be noted that the spherical element 102 has its substantially spherical cap-shaped portions 102" that are dimensioned in a manner so that once the radial expansion of the spherical element 102 has been obtained, these are homogeneously in abutment against the inner surface of the seat 103, thereby ensuring a wide engagement surface between the spherical element 102 and the respective seat.

In other words, the spherical element 102, in its expanded configuration, has a geometrical shape, for example that of a ball, which corresponds exactly to that of the seat 103.

The amount of interference between the outer surface of the spherical element 102 itself and the inner surface of the seat 103 can be varied as a function of the amount of radial expansion of the element 102, partially limiting or completely blocking the movement of the ball joint 100. Moreover, since the radial expansion of the spherical element 102 is substantially symmetrical, the spherical element 102 goes in abutment in a homogeneous manner against the seat 103, ensuring a stable and secure blocking of the ball joint 100.

By acting on the at least one locking nut 111 in a reverse way, the external diameter of the spherical element 102 is reduced, thereby re-establishing the movement of the ball joint 100.

As for the first embodiment, in order to ensure an even more secure and stable blocking of the blocking means 108 it is possible to provide for a counter-nut, not shown in the figures, to be placed in abutment against the locking nut 111 and avoid, in such a manner, accidental loosening thereof.

Furthermore, the locking nut 111 can comprise elastic elements of a per se known type or equivalent elements, so as to ensure the stable locking along the threaded portion 107.

Again, analogously to the first embodiment, in order to ensure a correct centring of the insert 104 along the through opening 105, in order to ensure a substantially symmetrical radial expansion of the spherical element 102, at least one guide element 112 is provided, which projects from the insert 104 and that can be slidingly engaged in the at least one notch 109.

Two guide elements 112 can be provided, which are opposite to one another, engaged in the corresponding notches 109 obtained in a diametrical position in the spherical element 2.

In one embodiment shown in FIGS. 7 and 8, the guide element 112 comprises two tabs 113 radially extending from the insert 104.

However, further embodiment are possible, in which the guide element 112 has a pin shape or the like, suitable for sliding along corresponding notches 109.

In order to connect one first and one second component to one another through the ball joint 100 according to the second embodiment of the present invention, the spherical element 102 is inserted in the respective seat 103 obtained in a first component and the ball joint 100 is connected, through insert 104, to the second component.

An insert of this type is designed to be housed in a respective hollow seat 103 configured substantially like a spherical cap and, more particularly, having a radius of curvature that is slightly longer than the curvature radius R of the substantially cap-shaped portions 102" of insert 100, and defining an inlet mouth 103' with a substantially circular configuration with a radius that is slightly longer than the radius r of the circular section of the substantially cylindrical central portion 102', but shorter than the radius of curvature R of the substantially cap-shaped portions 102". The substantially spherical cap-shaped housing seat 103 has a volume that is at least equal to half the volume of spherical element 102.

The seat 103, moreover, in order not to interfere with the insert 104 during the insertion of the joint 100 in it, is open at the top (opening 103"). With such a configuration the ball joint 100 can be inserted in the respective seat 103 only with the respective spherical element 102 arranged with the bases of the substantially cylindrical portion 102' parallel to the inlet mouth 103' and the insert aligned with the opening 103".

The spherical element 102 of the joint is configured so that, once it is inserted in its housing seat, it is free to rotate inside it ("movable" configuration) and, therefore, it makes it possible for the ball joint 100 to be oriented in the desired position.

Advantageously, with such a configuration of the housing seat 103, as soon as the ball joint 100 is moved into the seat 103 with respect to its insertion position, for example by angularly moving the insert 104 downwards, the spherical element 102 of the joint 100 is pivotally engaged in the seat itself, since the inlet mouth 103' has dimensions such as to prevent it from coming out.

The ball joint 100 is blocked in position in the respective seat as already described above.

It will be noted that the dimensions of the housing seat 103 are such that the amount of surface of the spherical element 102, brought into contact with the housing seat, is high and this promotes a secure and durable locking of the ball joint 100 in the desired position.

With reference now to FIGS. 10 to 13, it can be noted how a ball joint according to a third embodiment of the present invention is indicated with reference numeral 200 and comprises a substantially spherical element 202, designed in use to be positioned inside a respective hollow housing seat 203 obtained in a first component, and an insert 204, connected to the spherical element 202, as will be better described below, and associable, in use, with a second component.

More particularly, the spherical element 202 comprises a substantially cylindrical central portion 202', between two substantially spherical cap shaped portions 202". The spherical element 202 is dimensioned so that the circular base of each substantially spherical cap shaped portion 202" matches a respective base of the substantially cylindrical portion 202'. The spherical element 202 can be obtained either enbloc, for example through milling of a portion of the outer surface of the spherical element itself, or it can be obtained through the assembly, in a manner known to the skilled person, of many separate components. The insert 204 above, has an elongated configuration and extends radially from the spherical element 202 at the side face of the substantially cylindrical portion 202'. In the substantially cylindrical portion 202' a radial housing seat, for example a threaded one, is provided for a respective portion of the insert 204 (not illustrated in the figures), on which a threading is obtained with a corresponding pitch. In any case, the engagement between the insert 204 and the spherical element 202 can be obtained through equivalent engagement means, for example of the snap-insertion type or the like.

The substantially cylindrical central portion 202' has, at the circular cross-section thereof, a radius r shorter than the curvature radius R of each substantially spherical-cap portion 202", so that the spherical element 202 has reduced overall dimensions in a plane parallel to the bases of such a substantially cylindrical central portion 202' (FIG. 11).

The free end of the insert 204, which has for example a cylindrical configuration, is designed to be inserted, in use, inside a corresponding seat, not illustrated in the enclosed figures, which is obtained in a second component. For such a purpose, therefore, an annular recess 207 can be provided on the insert, for engagement with corresponding engagement means specifically foreseen in the second component. Other configurations of the engagement means, known to the man skilled in the art, can, in any case, be provided. The insert 204 can, for example, comprise a threaded portion that can be screwed/unscrewed in/from a corresponding seat provided in the second component, which seat is in turn threaded with the same threading pitch.

It is of note that the configuration of the insert according to the second embodiment is very simple.

Such an insert is designed to be housed in a respective hollow housing seat 203 having a substantially spherical-cap shaped configuration and, more particularly, having a curvature radius that is slightly longer than the curvature radius R of the substantially cap-shaped portions 202" of insert 200, and delimiting an inlet mouth 203' with a substantially circular configuration, having a radius that is slightly longer than the radius r of the circular section of the substantially cylindrical central portion 202', but shorter than the curvature radius R of the substantially cap-shaped portions 202". The substantially cap-shaped hollow housing seat 203 has a volume that is at least equal to half the volume of the spherical element 202.

The hollow seat 203 is open at the top (opening 203") so as to not interfere with the insert 204 of the ball joint 200, when it is inserted into the seat. The first component has two plates 214 of a jaw-like end 214 at such an upper opening 203" on the opposite sides thereof, which jaw-like end is provided, as described in greater detail below, for blocking/clamping in position the spherical element 202 of joint 200 in the seat 203.

Advantageously, the substantially cap-shaped housing seat 203 is dimensioned so that, once the spherical element of the joint 200 is blocked in position, the housing seat is homogeneously in abutment against the surface of the substantially cap-shaped portions 202" of the joint, thereby ensuring that a wide engagement surface is provided between the spherical element 202 and the seat.

In other words, the housing seat 203 in its fixing configuration has a geometrical shape, which for example can be that of a spherical seat, corresponding exactly to that of the spherical element of the joint 200. With such a configuration the ball joint 200 can be inserted in the respective seat 203 only when it is arranged with the bases of the cylindrical portion 202' parallel to the inlet mouth 203' and the insert 204 is aligned with the opening 203" between the two plates.

The ball joint 200 according to the third embodiment of the present invention comprises blocking means 211 intended, in use, to prevent the rotation of the spherical element 202 of the joint 200 once it is inserted in the respective seat 203.

Such blocking means 211 comprise, for example, locking means of the two plates of the jaw-like end 214, for example a screw 212 that can be screwed/unscrewed in/from corresponding threaded seats 213 specifically obtained in the plates referred to above.

Once the spherical element 202 of the joint is inserted in the respective seat 203 and rotated in the desired position, by screwing the screw 212 in the respective seats 213 a locking of the plates of the jaw-elements 214 and a consequent reduction of the housing seat 203, sufficient, as explained above, so as to obtain the efficient blocking of the spherical element 202 in the desired position is obtained.

Advantageously, in order to maintain the blocking means within the overall dimensions of the first component, the plate portion of the jaw-like end 214 which, in use, is in contact with the head of the screw, is provided with a smaller thickness.

Optionally, a mark on the screw 212 can be provided, intended to indicate to the operator the correct locking of the two plates of the jaw end 214, during the blocking of the joint 200 in the respective seat 203.

The operation of the ball joint of the present invention is as follows.

With reference to the first embodiment, starting from the ball joint 1, 1', in the movable configuration, in which the spherical element 2 is not expanded, the spherical element 2 is positioned inside a corresponding seat 3 provided in a first component.

The opposite end of the ball joint 1, 1', in which a threaded portion 7 is provided, is then connected inside a corresponding threaded seat of a second component. A hinge connection is thus obtained, that is initially movable, between the first and the second component.

The ball joint 1, 1' is then placed in the desired position and, by acting upon the blocking means 8, the expansion of the spherical element 2, 2' inside the seat 3, 3' is obtained, indeed blocking the movement of the ball joint 1, 1'.

In such a way the movement of the first component with respect to the second component is prevented.

If it is desired to allow a reduced movement of the ball joint 1, 1' in the respective seat 3, 3' it is possible to act on the blocking means 8, by loosening the at least one locking nut 11, 11'. In such a way, there is a radial contraction of the spherical element 2, 2' that was previously expanded, thereby reducing the interference between the outer surface of the latter and the inner surface of the seat 3, 3'.

The assembly of the ball joint 1, according to the present invention, is simple to obtain.

Moreover, by acting upon the blocking means 8 it is possible to modify the movement of the ball joint 1, 1' in an easy and rapid way, since adjustment locking nut 11, 11' directly associated with the ball joint 1, 1' is manipulated.

With reference to the second preferred embodiment of the present invention, for inserting the ball joint 100 inside the seat 103 obtained in a first component, the joint is positioned so that the insert 104 is aligned with the opening 103" of the seat 103 and the substantially cylindrical central portion 102' has its circular bases arranged parallel to the inlet mouth 103' of the seat 103 (FIGS. 7 and 8).

The ball joint 100 is then inserted inside the seat 103 and the insert 104 of the joint is brought into the desired position. It is of note that, as soon as the ball joint 100 is moved into the seat with respect to its insertion position, for example by angularly moving the insert 104 downwards, the spherical element 102 of the joint 100 remains engaged inside the seat, since the hollow housing seat and the inlet mouth 103' have dimensions such as to prevent it from coming out.

Once the insert 104 is brought into a desired position, the locking nut 111 is inserted and screwed on to the threaded portion 107 of the insert 104 in order to block its rotation inside the seat 103, thus obtaining a substantially homogeneous radial expansion of the spherical element 102. As mentioned above, the substantially cap-shaped portions 102" of the spherical element will have the respective surfaces uniformly in abutment against the inner wall of the seat 103, thus obtaining an effective blocking of the insert.

Then, the insert 104 is engaged with the respective second component, thereby obtaining a connection between the first and a second component according to the desired angular directions.

If it is necessary to disconnect the ball joint 100 from the respective components the same step are carried out in opposite order.

With reference to the third preferred embodiment of the invention, as briefly mentioned above, for inserting the ball joint 200 inside the seat 203 obtained in a first component, the joint is positioned so that the insert 204 is aligned with the upper opening 203" comprised between the plates of the jaw-like end 214 and the substantially cylindrical central portion 202' has its circular bases arranged parallel to the inlet mouth 203' of the seat 203 (FIGS. 10 and 11).

The ball joint 200 is then inserted inside the seat 203 and the insert 204 of the joint is brought into the desired position. It will be noted that, as soon as the ball joint 200 is moved into the seat with respect to its insertion position, for example by angularly moving the insert 204 downwards, the spherical element 202 of the joint 200 remains engaged in the seat, due to the fact that the seat itself and the inlet mouth 203' are dimensioned such as to prevent it from coming out.

Once the insert 204 is brought into a desired position and in order to block its rotation inside the seat 203, the screw 212 is inserted and screwed inside the threaded seats 213, thereby locking the plates of the jaw end 214 to one another.

In such a way, the compression of the jaw end 214 determines a reduction of the housing seat 203, sufficient to obtain the homogeneous engagement between the substantially cap-shaped portions 202" of the spherical element 202 and the inner surface of the seat 203, thereby ensuring that the joint is effectively blocked.

As can be noted, the dimensions of the housing seat 203 are such that the amount of surface of the spherical element 202 in contact with the housing seat is high and this promotes a secure and durable blocking of the joint 200 in the desired position.

Then the insert 204 is engaged with the respective second component, thereby obtaining a connection between the first and a second component according to the desired angular directions.

If it is necessary to disconnect the ball joint 200 from the respective components, the same steps are carried out in opposite order.

The ball joint according to the second embodiment is structurally simple and east to apply.

The invention thus conceived can be subject to numerous modifications and variations all covered by the inventive concept.

Moreover, all the details can be replaced by other technically equivalent elements. In practice, the materials used, as well as the contingent shapes and sizes can be any, depending on the case, without departing for this reason from the scope of protection of the following claims.

The invention claimed is:

1. A ball joint comprising:
    a spherical element, at least partially housable in a hollow housing seat of a first component, wherein the spherical element comprises a substantially cylindrical central portion between two substantially spherical cap shaped portions arranged with respect to one another so that a circular base of a substantially spherical cap shaped portion matches a respective base of said substantially cylindrical central portion;
    an insert, connected to said substantially cylindrical central portion of the spherical element and removably associable with a second component, wherein said insert radially extends from a side face of said substantially cylindrical central portion,
    wherein said substantially cylindrical central portion of said spherical element has a circular cross section with radius (r) shorter than a curvature radius (R) of each of said substantially spherical cap shaped portions, so that said spherical element has reduced overall dimensions in a plane parallel to the bases of said substantially cylindrical central portion,
    wherein said housing seat has a substantially spherical cap configuration with curvature radius slightly longer than the radius (R) of said substantially spherical cap shaped portions and delimits an inlet mouth configured substantially circular with a radius slightly longer than said radius (r) of said circular cross-section of the substantially cylindrical central portion, but shorter than said curvature radius (R) of said substantially spherical cap shaped portions, and
    wherein said hollow housing seat includes an upper opening for receiving, during the assembling of said spherical element into said housing seat, said insert of said joint.

2. The ball joint according to claim 1, wherein an annular recess is provided at a free end of said insert.

3. The ball joint according to claim 1, comprising blocking means for said spherical element in said housing seat.

4. The ball joint according to claim 3, wherein said blocking means comprise a screw.

5. The ball joint according to claim 1, wherein the hollow housing seat is clampable around said spherical element through a blocking means.

6. The ball joint according to claim 1, wherein an internal surface of said seat is uniformly in abutment on said substantially spherical cap shaped portions of said joint, when said spherical element of said joint is blocked in position, thereby assuring a wide engagement surface between said spherical element and the seat itself.

* * * * *